No. 835,122. PATENTED NOV. 6, 1906.
J. F. THEURER.
APPARATUS FOR FILTERING BEER.
APPLICATION FILED FEB. 25, 1898.
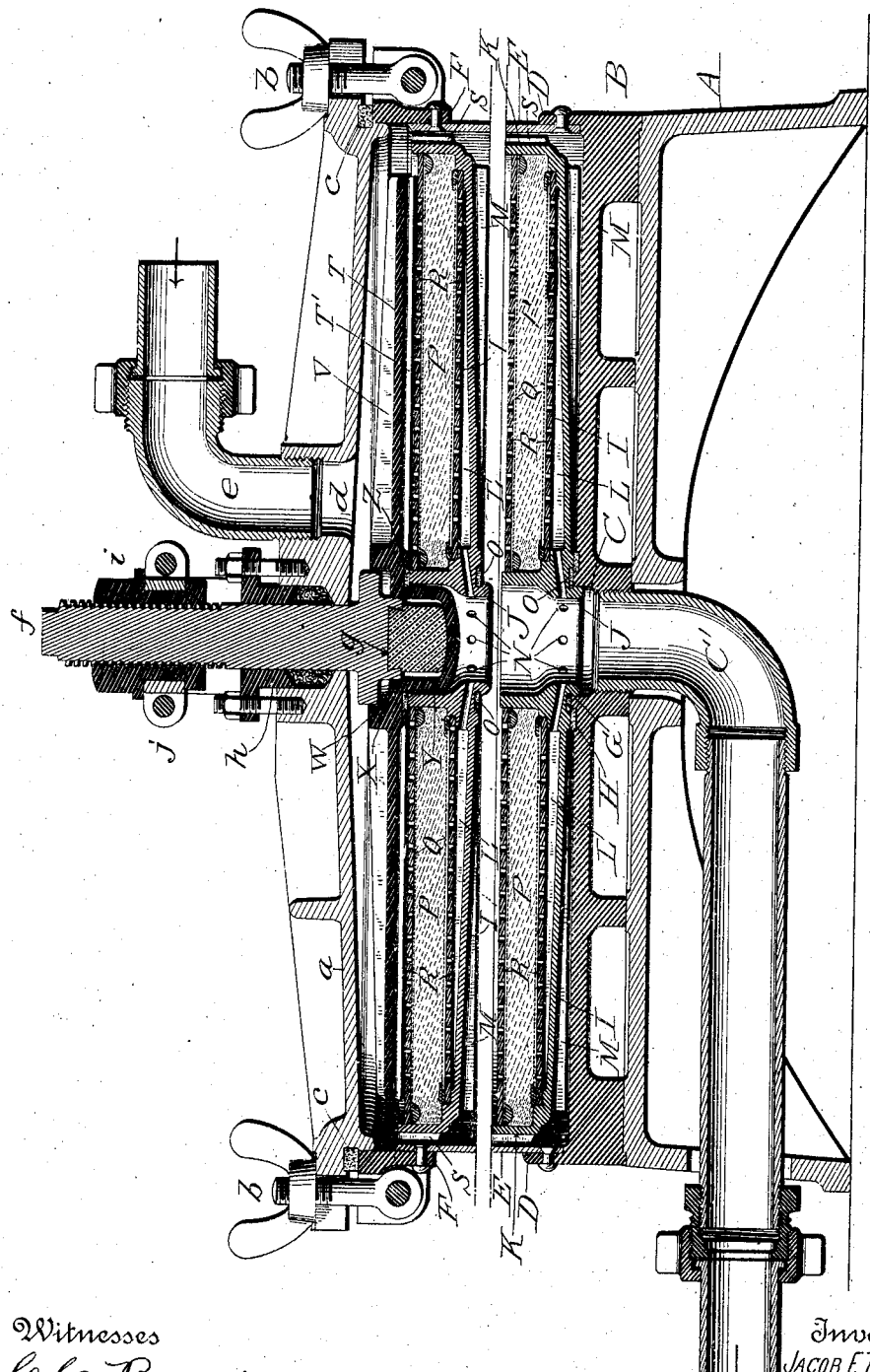
Witnesses
C. C. Burdine.
D. E. Burdine.
Inventor:
JACOB F. THEURER,
by Dodge and Sons,
Attorneys

UNITED STATES PATENT OFFICE.

JACOB F. THEURER, OF MILWAUKEE, WISCONSIN.

APPARATUS FOR FILTERING BEER.

No. 835,122.  Specification of Letters Patent.  Patented Nov. 6, 1906.

Application filed February 25, 1898. Serial No. 671,601.

*To all whom it may concern:*

Be it known that I, JACOB F. THEURER, a citizen of the United States, residing at Milwaukee, in the county of Milwaukee and State of Wisconsin, have invented certain new and useful Improvements in Apparatus for Filtering Beer, of which the following is a specification.

My present invention relates to improvements in beer-filters.

The construction of the apparatus is clearly illustrated in the annexed drawing, wherein the filter is shown in vertical section, the outer casing being broken away at the center and the upper and lower pans shown separated.

The object of the invention is to provide an improved construction of the filter and to cause the beer which is to be treated to pass through the filter in such a course that any gas which may become freed from the beer will be reabsorbed thereby, the gas thus saved, and a superior quality of beer obtained.

Referring to the drawing, A denotes a suitable stand upon which is mounted the base of the filter B, which preferably is circular in form and provided with a central opening C, from which extends a discharge or outlet pipe C'. The base has at its outer edge an upstanding collar or rim D, to which is securely fastened the shell or casing E, the upper edge of said casing in turn being directly connected to a comparatively heavy ring or hoop F. A slightly-projecting rim G is formed around the opening C, and a rubber packing-ring H is placed in a depression formed in the base around said ring.

The filtering bodies are held or supported within pans I, said pans having a central hollow boss J, the bottoms inclining from their outer walls K toward said boss. The bottoms are provided on their upper sides with a series of radial ribs L, the upper edges of which lie in a horizontal plane, while the under faces of said pans are formed with a series of ribs M, the lower edges of which are also in a horizontal plane.

It will be noted that the bosses are provided with a series of openings N, which open into the pan intermediate the ribs L and incline downwardly therefrom.

It will be seen that the lower ends of the bosses are slightly contracted, and these contracted ends are of such dimensions as to just fit within the opening C or the upper larger end of the boss of the pan below.

A packing-ring or gasket O is placed in the base of each pan around the lower projecting end of each boss.

The filtering medium or body comprises a mass of compressed pulp P, held between two wire disks Q, which in turn are between two perforated plates R, the lower one of the plates R resting on the ribs L. All the filtering bodies are alike, being formed from an equal mass of pulp of like consistency compressed to a determinate degree.

Suitable steps are taken to prevent seepage of the liquid between the edges of the mass and the pan, all of which is set forth in detail in Letters Patent No. 618,965, granted to me under date of February 7, 1899.

The pans are each provided with a series of guides or spacing projections S, which extend outwardly from the walls K and tend to center the pans within the casing, causing the boss of the lower pan to enter the discharge-opening C and the lower projecting end of the boss of each succeeding pan to enter the one immediately below it. When the pans are in place, the ribs M of the upper pans bear directly upon the upper disk or plate R of the pan below, keeping it in place and preventing the pulp from warping or swelling and getting out of place, as it might otherwise do when wet by the passing liquid.

To keep the mass of the upper pan in place, to force the pans down tightly one upon the other, and to close up the upper end of the upper boss, a compression plate or disk T is employed. Said disk has a series of radial ribs T' formed upon its under face, which bear directly upon the perforated disk R immediately below it. It also has a series of strengthening-ribs V formed upon its upper face, which extend from a central collar W to the edge. The collar W forms the outer wall of a socket X, below which extends a hollow cup Y, the cup fitting down into the upper end of the hollow boss J, as shown, and by reason of the packing-ring Z forms a tight connection therewith and effectually closes all entrance to the interior of the bosses, except through the passages N.

A cover *a* extends over the upper end of the casing and is secured thereon by suitable bolts and thumb-nuts *b*, as shown, a packing-ring *c* being interposed between the ring F and the cover. Said cover is provided with an opening $d$, into which is secured the inlet-pipe $e$, and also with a central opening in which is mounted a screw-stem $f$, carrying at its lower end a rubber cushion $g$, which bears against the bottom of cup Y.

A packing-gland $h$ is provided for the screw, and a nut $i$, held against endwise mevement by suitable means $j$, is provided for raising and lowering the screw. After the pans with their filtering elements are placed within the casing and the compression-disk and top have been put in place the screw-stem $f$ is forced downward, crowding the pans tightly together one upon the other and the compression-disk upon the upper perforated plate or disk R.

At the same time the rubber cushion $g$ is also compressed, and if when the beer is forced into the filter any bulging of the top should result, due to the pressure exerted, it will be compensated for by the expansion of the rubber cushion and the joints between the other parts kept intact and tight. As the beer comes into the casing from the pipe $e$ it passes onto the top of each pan and is forced through the filtering mass contained therein, the clear beer running down the inclined bottom of the pans and discharging into the central bosses through the openings N, whence it passes out through the discharge-pipe C'.

In passing beer through a filter a considerable amount of gas is freed therefrom, and heretofore efforts have been made to collect this liberated gas with but little success. I have discovered that by passing the beer in from the top and withdrawing it from the bottom the incoming beer will absorb the liberated gas and also that the filtered beer will absorb any gas which may collect in the hollow bosses J. In this way not only is all the gas saved, but a finer beer results.

While I have shown but two pans in the drawing, it is manifest that any number of pans may be employed, the size of the casing being varied accordingly; nor do I desire to limit myself to the carrying out of the process in the particular filter herein described, as it is apparent now that the discovery has been made that the process may be carried out in various forms of filters.

I have also found that beer without gas may be entered into the filter along with the requisite amount of free gas and the beer impregnated within the filter with carbonic-acid gas to the degree required.

No claim is made herein to the process set forth in this application, as the same is specifically reserved for a divisional application.

Having thus described my invention, what I claim is—

1. In a filter, the combination of a shell or housing; a filtering medium contained therein; a cover; a compression-plate for the filtering medium; and an expansible device held between said plate and cover, whereby when internal pressure is exerted upon the cover by the incoming fluid its outward flexure will be compensated for, substantially as described.

2. In a filter, the combination of a shell or housing; an outlet-opening formed therein; a filtering medium having a discharge-passage designed to fit within said opening; a compression-plate bearing upon the opposite side of said filtering medium; a cover; and an expansible device held between said cover and the compression-plate, substantially as and for the purpose described.

3. In a filter, the combination of a shell or housing; an outlet-opening formed therein; a pan having a hollow central boss the lower end of which fits within the outlet-opening; a mass of compressed pulp within said pan; a compression-plate having a series of ribs upon its under face; a central depending cup Y designed to fit within the upper end of the boss; a cover; a screw-stem passing through the cover and having at its lower end a yielding cushion bearing in the cup; and an inlet-opening.

4. In a filter, the combination of a shell or housing; a central outlet-opening C formed in the base thereof; a series of pans having central hollow bosses J, and ribs M formed upon their under faces; a compression-plate T having ribs upon its under face, and a central depending cup Y; a cover; a screw-stem $f$ mounted in said cover and carrying at its lower end a yielding cushion $g$; and an inlet-opening.

5. In a filter, the combination of a shell or housing provided with inlet and discharge openings; a series of pans supported therein, the bottom of each pan inclining toward a discharge-outlet formed therein; and a series of ribs carried by the under face of each pan, the outer edges of said ribs bearing upon the upper face of the adjacent filter element, substantially as described.

In witness whereof I hereunto set my hand in the presence of two witnesses.

JACOB F. THEURER.

Witnesses:
RICHARD BIRKHOLZ,
E. P. SCHMITT.